United States Patent
Moratz

(10) Patent No.: US 9,488,227 B2
(45) Date of Patent: Nov. 8, 2016

(54) VARIABLE TORQUE BEARING

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/813,235

(22) Filed: Jul. 30, 2015

(65) Prior Publication Data

US 2016/0076595 A1 Mar. 17, 2016

Related U.S. Application Data

(60) Provisional application No. 62/051,502, filed on Sep. 17, 2014.

(51) Int. Cl.
| | |
|---|---|
| *F16J 15/16* | (2006.01) |
| *F16C 33/78* | (2006.01) |
| *F16J 15/34* | (2006.01) |
| *F16J 15/00* | (2006.01) |
| *F16J 15/32* | (2016.01) |
| *F16C 19/06* | (2006.01) |

(52) U.S. Cl.
CPC .............. *F16C 33/784* (2013.01); *F16C 19/06* (2013.01); *F16C 33/7859* (2013.01); *F16C 33/7866* (2013.01); *F16J 15/002* (2013.01); *F16J 15/3204* (2013.01); *F16J 15/3244* (2013.01); *F16J 15/3448* (2013.01)

(58) Field of Classification Search
CPC .............. F16C 33/6637; F16C 33/664; F16C 33/6651; F16C 33/6655; F16C 33/6659; F16C 33/6674; F16C 33/78; F16C 33/783; F16C 33/7836; F16C 33/784; F16C 33/7859; F16C 33/7863; F16C 33/7866; F16J 15/16; F16J 15/3224; F16J 15/3436; F16J 15/3448; F16J 15/002; F16J 15/3244; F16J 15/46
See application file for complete search history.

(56) References Cited

U.S. PATENT DOCUMENTS

| | | | | |
|---|---|---|---|---|
| 1,910,061 | A | * 5/1933 | Schatz | ................ F16C 33/7859 277/423 |
| 2,173,247 | A | 9/1939 | Bott | |
| 4,103,903 | A | * 8/1978 | Capriotti | .................. F16J 15/46 277/387 |
| 5,106,209 | A | 4/1992 | Atkinson et al. | |
| 5,649,772 | A | 7/1997 | Schlereth et al. | |
| 6,966,558 | B2 * | 11/2005 | Murakami | .......... F16C 33/7859 277/549 |

FOREIGN PATENT DOCUMENTS

| | | |
|---|---|---|
| EP | 2287481 A1 | 2/2011 |
| JP | 2007107588 A | 4/2007 |
| JP | 2012163148 A | 8/2012 |

OTHER PUBLICATIONS

Barden—Precision Bearing Closures—Flexeal, Barseal, Shield, Oct. 1996.

* cited by examiner

*Primary Examiner* — Alan B Waits
(74) *Attorney, Agent, or Firm* — Volpe and Koenig, P.C.

(57) ABSTRACT

A rolling bearing assembly including at least one hydraulic fluid gallery for adjusting at least one seal is provided. The rolling bearing assembly includes a radially inner ring and outer ring. The radially outer ring includes a first circumferentially extending seal groove. The radially outer ring includes a second circumferentially extending seal groove having a pressure groove therein, and at least one hydraulic fluid gallery including an inlet and an outlet connected to the pressure groove. The at least one seal includes a radially outer end engaged within the second circumferentially extending seal groove, and a radially inner end located in the first circumferentially extending seal groove, and the pressure groove is located inside of an axial end face of the at least one seal.

9 Claims, 3 Drawing Sheets

… (1) …

VARIABLE TORQUE BEARING

INCORPORATION BY REFERENCE

The following document is incorporated herein by reference as if fully set forth: U.S. Provisional Patent Application No. 62/051,502 filed Sep. 17, 2014.

FIELD OF INVENTION

The present invention relates to a rolling bearing assembly, and is more particularly related to a seal for a rolling bearing assembly.

BACKGROUND

Bearing assemblies are used in a wide range of applications. Some applications require a seal arranged between a radially inner ring and a radially outer ring of the bearing to prevent contaminants from entering the area of the rolling elements. The radially outer end of the seal is typically fixed to the radially outer ring and the radially inner end of the seal typically contacts the radially inner ring. Seals exhibit varying sealing characteristics depending on the rotational speed of the shaft or rotor on which the bearing assembly is supported. The sealing characteristics also vary depending on the force with which the radially inner end of the seal is pressed against the radially inner ring. When the radially inner end of the seal is engaged with the radially inner ring, then the seal produces drag torque which is undesirable in certain applications due to the friction and heat which is generated. It would be desirable to provide a rolling bearing assembly including a configuration that allows a position of the seal to be adjusted to vary the seal's sealing characteristics and also the drag torque.

SUMMARY

A rolling bearing assembly including an axially adjustable seal is provided. The rolling bearing assembly includes a radially inner ring defining an inner race and including a first circumferentially extending seal groove. A radially outer ring defines an outer race, and includes a second circumferentially extending seal groove having a pressure groove therein, and at least one hydraulic fluid gallery including an inlet and an outlet connected to the pressure groove. Rolling elements are supported between the radially inner ring and the radially outer ring, and the rolling elements run on the inner race and the outer race. At least one seal includes a radially outer end engaged within the second circumferentially extending seal groove, and a radially inner end located in the first circumferentially extending seal groove. The pressure groove is located inside of an axial end face of the at least one seal. In a first, non-pressurized operating condition, the radially inner end of the at least one seal contacts the first circumferentially extending seal groove on the radially inner ring. In a second operating condition, the at least one hydraulic fluid gallery is supplied with pressurized hydraulic fluid, and the at least one seal is moved outwardly in an axial direction such that the radially inner end of the at least one seal disengages from the radially inner ring.

A method of adjusting an axial position of a seal in a rolling bearing assembly is also provided. The method includes providing a rolling bearing assembly including a radially inner ring defining an inner race and including a first circumferentially extending seal groove. The rolling bearing assembly includes a radially outer ring defining an outer race, and including a second circumferentially extending seal groove having a pressure groove therein, and at least one hydraulic fluid gallery including an inlet and an outlet connected to the pressure groove. The rolling bearing assembly includes at least one seal including a radially outer end engaged within the second circumferentially extending seal groove, and a radially inner end located in the first circumferentially extending seal groove, and the pressure groove is located inside of an axial end face of the at least one seal. The method includes supplying pressurized hydraulic fluid via the at least one hydraulic fluid gallery. The method includes moving the at least one seal via pressurized hydraulic fluid from the outlet of the at least one hydraulic fluid gallery from (a) a first position in which the radially inner end of the at least one seal contacts the first circumferentially extending seal groove on the radially inner ring to (b) a second position in which the radially inner end of the at least one seal disengages from the radially inner ring.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
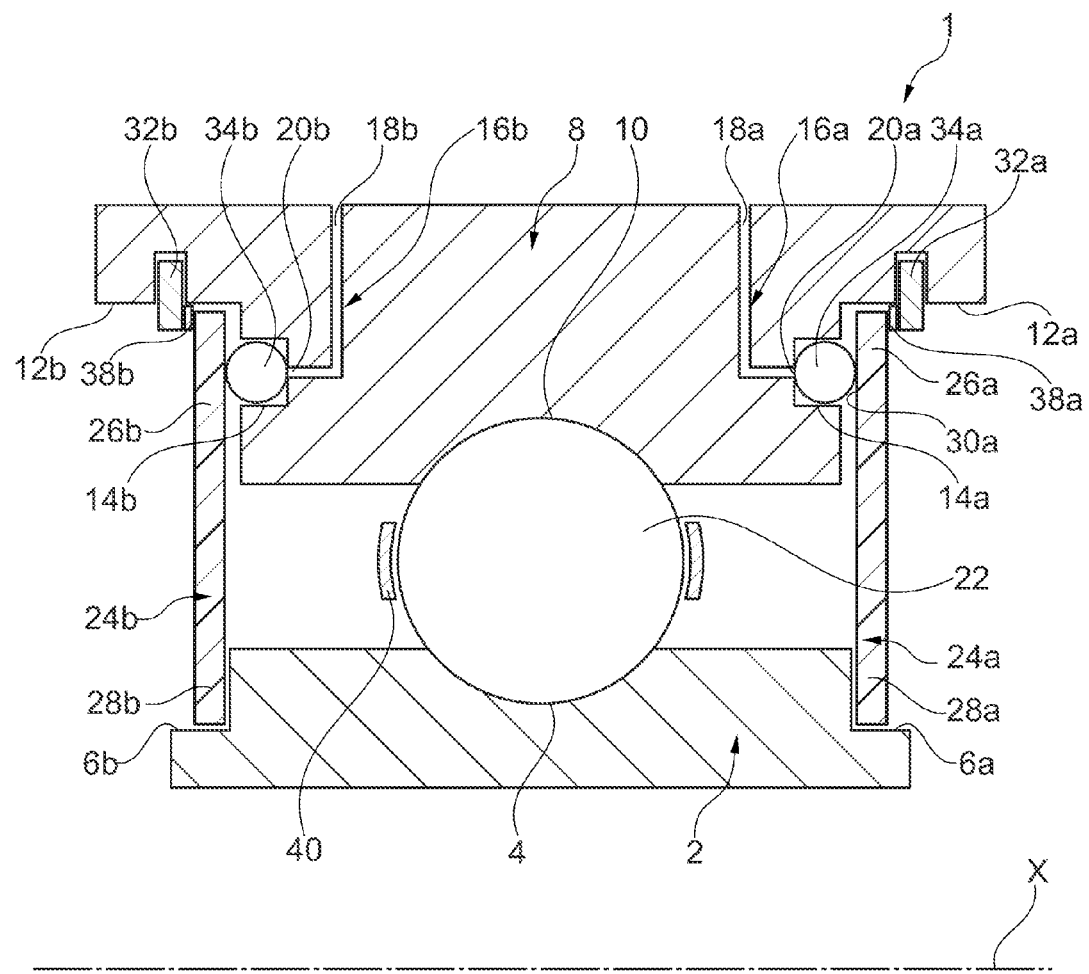
FIG. 1 shows a cross sectional view of a rolling bearing assembly according to one embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIG. 1, a rolling bearing assembly 1 is provided. The rolling bearing assembly 1 includes a radially inner ring 2 defining an inner race 4 and including a first circumferentially extending seal groove 6a. A radially outer ring 8 defines an outer race 10 and includes a second circumferentially extending seal groove 12a having a pressure groove 14a therein, and at least one hydraulic fluid gallery 16a including an inlet 18a and an outlet 20a connected to the pressure groove 14a. As shown in FIG. 1, the inlet 18a is formed on a radially outer surface of the outer ring 8. One of ordinary skill in the art will recognize that the inlet 18a and the at least one hydraulic fluid gallery 16a can have different configurations, depending on the arrangement of the rolling bearing assembly 1. Rolling elements 22 are supported between the radially inner ring 2 and the radially outer ring 8, and the rolling elements 22 run on the inner race 4 and the outer race 10.

The rolling bearing assembly 1 includes at least one seal 24a having a radially outer end 26a engaged within the second circumferentially extending seal groove 12a, and a radially inner end 28a located in the first circumferentially extending seal groove 6a. The pressure groove 14a is located inside of an axial end face 30a of the at least one seal 24a. In one preferred embodiment, a snap wire or snap ring 32a secures the at least one seal 24a in the second circumferentially extending seal groove 12a. In one preferred embodiment, an O-ring 34a is arranged in the pressure groove 14a between the outlet 20a of the at least one hydraulic fluid gallery 16a and the at least one seal 24a. In another embodiment shown in FIG. 2, a circular protrusion 36 is formed integrally with the at least one seal 24', and the circular protrusion 36 is located in the pressure groove 14a.

Figure 2:
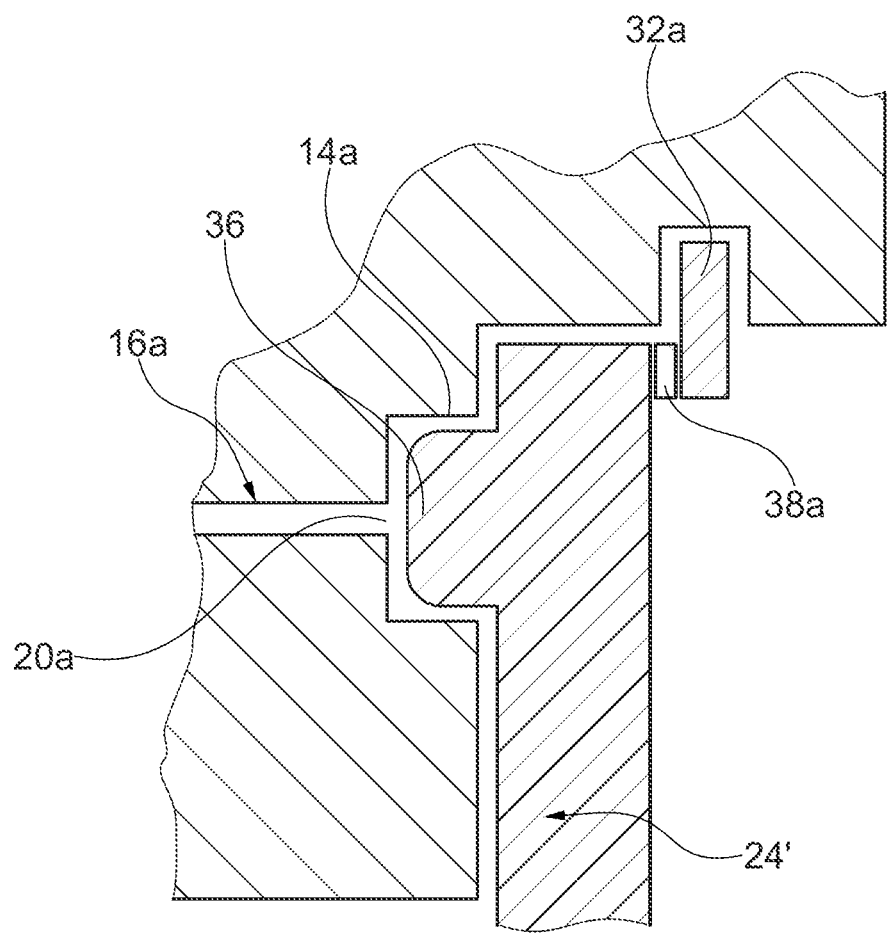
FIG. 2 shows a partial cross sectional view of a seal in a rolling bearing assembly according to one embodiment.
Figure 3A:
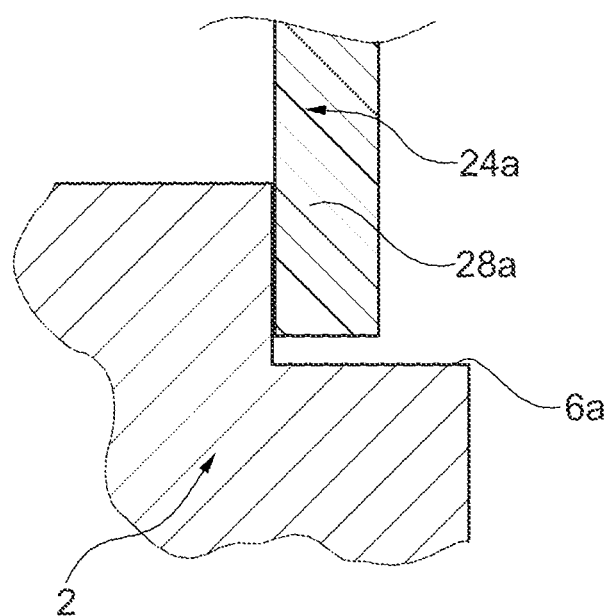
FIGS. 3A and 3B show the seal of FIG. 1 in first and second positions with respect to a radially inner ring.
Figure 3B:
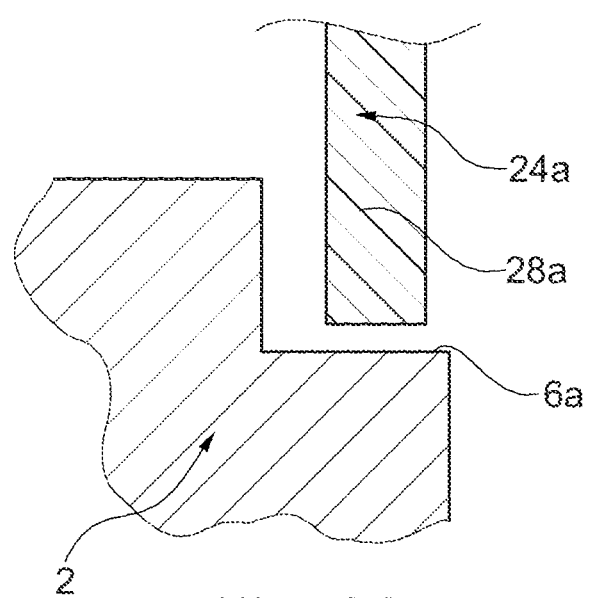

In a first non-pressurized operating condition shown in FIG. 3A, the radially inner end 28a of the at least one seal 24a contacts the first circumferentially extending seal groove 6a on the radially inner ring 2. In a second operating condition shown in FIG. 3B, the at least one hydraulic fluid gallery 16a is supplied with pressurized hydraulic fluid, and the at least one seal 24a is moved outwardly in an axial direction such that the radially inner end 28a of the at least one seal 24a disengages from the radially inner ring 2. As shown in FIGS. 1 and 2, a spring or wave washer 38a, 38b is provided between the snap ring 32a, 32b to bias the seal 24a, 24b axially inwardly. During operation, pressurized hydraulic fluid forces the O-ring 34a, 34b axially outwardly against the seals 24a, 24b, and once pressurized hydraulic fluid is not provided, the spring or wave washer 38a, 38b forces the seals 24a, 24b back to their initial non-pressurized positions.

In the embodiment shown in FIG. 1, the radially inner ring 2 includes two of the first circumferentially extending seal grooves 6a, 6b arranged on either axial side of the inner race 4, the radially outer ring 8 includes two of the second circumferentially extending seal grooves 12a, 12b on either axial side of the outer race 10, and the second circumferentially extending seal grooves 12a, 12b each include one of the pressure grooves 14a, 14b. In this arrangement, two seals 24a, 24b are provided, each including a radially outer end 26a, 26b engaged within a respective one of the second circumferentially extending seal grooves 12a, 12b, and a radially inner end 28a, 28b located in a respective one of the first circumferentially extending seal grooves 6a, 6b. This arrangement also includes two hydraulic fluid galleries 16a, 16b, each including an inlet 18a, 18b and an outlet 20a, 20b, and the outlet 20a, 20b is connected to a respective one of the pressure grooves 14a, 14b. This configuration can be advantageous for bearing in which both axial sides are exposed during use. However, arrangements in which a single seal 24a is provided are also within the scope of the invention. In the embodiment shown in FIG. 1, the rolling bearing assembly 1 includes a cage 38.

A method of adjusting an axial position of a seal 24a in a rolling bearing assembly 1 is also provided. The method includes providing a rolling bearing assembly 1 including a radially inner ring 2 defining an inner race 4 and including a first circumferentially extending seal groove 6a. A radially outer ring 8 defines an outer race 10, and includes a second circumferentially extending seal groove 12a having a pressure groove 14a therein. At least one hydraulic fluid gallery 16a includes an inlet 18a and an outlet 20a connected to the pressure groove 14a. Rolling elements 22 are supported between the radially inner ring 2 and the radially outer ring 8, and the rolling elements 22 run on the inner race 4 and the outer race 10. At least one seal 24a is arranged between the radially inner ring 2 and the radially outer ring 8 and includes a radially outer end 26a engaged within the second circumferentially extending seal groove 12a, and a radially inner end 28a located in the first circumferentially extending seal groove 6a, and the pressure groove 14a is located inside of an axial end face 30a of the at least one seal 24a. The method includes supplying pressurized hydraulic fluid via the hydraulic fluid gallery 16a. The method also includes moving the at least one seal 24a via pressurized hydraulic fluid from the outlet 20a of the at least one hydraulic fluid gallery 16a from (a) a first position (shown in FIG. 3A) in which the radially inner end 28a of the at least one seal 24a contacts the first circumferentially extending seal groove 6a on the radially inner ring 2 to (b) a second position (shown in FIG. 3B) in which the radially inner end 28a of the at least one seal 24a disengages from the radially inner ring 2. A spring or wave washer 38a, 38b provides a countering force to the pressurized hydraulic fluid force, and forces the seals 24a, 24b back to the first position.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rolling bearing assembly comprising:
   a radially inner ring defining an inner race and including a first circumferentially extending seal groove;
   a radially outer ring defining an outer race, and including a second circumferentially extending seal groove having a pressure groove therein, and at least one hydraulic fluid gallery including an inlet and an outlet connected to the pressure groove;
   rolling elements supported between the radially inner ring and the radially outer ring, the rolling elements running on the inner race and the outer race; and
   at least one seal including a radially outer end engaged within the second circumferentially extending seal groove, and a radially inner end located in the first circumferentially extending seal groove, and the pressure groove is located inside of an axial end face of the at least one seal,
   wherein in a first non-pressurized operating condition, the radially inner end of the at least one seal contacts the first circumferentially extending seal groove on the radially inner ring, and in a second operating condition, in which the at least one hydraulic fluid gallery is supplied with pressurized hydraulic fluid, the at least one seal is moved outwardly in an axial direction such that the radially inner end of the at least one seal disengages from the radially inner ring.

2. The rolling bearing assembly of claim 1, further comprising a snap wire or snap ring that secures the at least one seal in the second circumferentially extending seal groove.

3. The rolling bearing assembly of claim 2, further comprising a spring or wave washer arranged axially between the snap wire or snap ring and the at least one seal.

4. The rolling bearing assembly of claim 1, further comprising an O-ring arranged in the pressure groove between the outlet of the at least one hydraulic fluid gallery and the at least one seal.

5. The rolling bearing assembly of claim 1, further comprising a circular protrusion integral to the at least one seal located in the pressure groove.

6. The rolling bearing assembly of claim 1, wherein the radially inner ring includes two of the first circumferentially extending seal grooves arranged on either axial side of the inner race, the radially outer ring includes two of the second circumferentially extending seal grooves on either axial side of the outer race, and the second circumferentially extending seal grooves each include one of the pressure grooves.

7. The rolling bearing assembly of claim 6, wherein the at least one seal comprises two of the seals, and each of the seals includes the radially outer end engaged within a respective one of the second circumferentially extending seal grooves, and the radially inner end located in a respective one of the first circumferentially extending seal grooves.

8. The rolling bearing assembly of claim 7, wherein the at least one hydraulic fluid gallery comprises two hydraulic fluid galleries, and each of the hydraulic fluid galleries includes a respective one of the inlets and outlets, wherein each of the outlets is connected to a respective one of the pressure grooves.

9. A method of adjusting an axial position of a seal in a rolling bearing assembly, the method comprising:

providing a rolling bearing assembly including a radially inner ring defining an inner race and including a first circumferentially extending seal groove; a radially outer ring defining an outer race, and including a second circumferentially extending seal groove having a pressure groove therein, and at least one hydraulic fluid gallery including an inlet and an outlet connected to the pressure groove; rolling elements supported between the radially inner ring and the radially outer ring, the rolling elements running on the inner race and the outer race; and at least one seal including a radially outer end engaged within the second circumferentially extending seal groove, and a radially inner end located in the first circumferentially extending seal groove, and the pressure groove is located inside of an axial end face of the at least one seal;

supplying pressurized hydraulic fluid via the at least one hydraulic fluid gallery; and moving the at least one seal via pressurized hydraulic fluid from the outlet of the at least one hydraulic fluid gallery from (a) a first position in which the radially inner end of the at least one seal contacts the first circumferentially extending seal groove on the radially inner ring to (b) a second position in which the radially inner end of the at least one seal disengages from the radially inner ring.

* * * * *